United States Patent [19]

Tucker

[11] 3,781,783

[45] Dec. 25, 1973

[54] BOREHOLE LOGGING SYSTEM WITH IMPROVED DISPLAY AND RECORDING APPARATUS

[75] Inventor: Robert L. Tucker, Tulsa, Okla.

[73] Assignee: Seismograph Service Corporation, Tulsa, Okla.

[22] Filed: Apr. 18, 1972

[21] Appl. No.: 245,110

[52] U.S. Cl......... 340/18 DC, 340/18 R, 340/18 P, 346/33 WL, 346/108, 340/15.5 DS
[51] Int. Cl............................................. G01v 1/40
[58] Field of Search................. 346/33 WL, 107 W, 346/107 SC, 108; 181/.5 BE; 340/18 P, 18 DC, 15.5 DS, 15.5 VD; 178/6.6 A, DIG. 2

[56] References Cited
UNITED STATES PATENTS

| | | | |
|---|---|---|---|
| 3,402,388 | 9/1968 | Tucker | 346/33 WL |
| 3,619,484 | 11/1971 | Tanaka | 178/DIG. 2 |
| 3,663,748 | 5/1972 | Boon | 178/6.6 A |
| 3,430,256 | 2/1969 | Goodman | 346/107 |

Primary Examiner—Benjamin A. Borchelt
Assistant Examiner—H. A. Birmiel
Attorney—C. Frederick Leydig et al.

[57] ABSTRACT

Improved borehole logging apparatus for use with a borehole tool obtaining a transmitter for periodically generating an acoustic signal at varying depths within a borehole and a receiver spaced from said transmitter for receiving the acoustic energy resulting from the generator acoustic signal. Signals respectively representing the acoustic energy generated by the transmitter, the acoustic energy detected by the receiver and the depth of the downhole tool are transmitted to an improved indicating and recording device which includes a series of light sources closely spaced in a linear array and sequentially illuminated by the received signals during the interval between successive transmitted signals so as to impress a linear trace across a recording medium which provides first and second dimensions of information corresponding respectively to the magnitude of the received acoustic energy and the arrival time of the acoustic energy with respect to the time of transmission of the corresponding acoustic signal. A third dimension of information results from the provision of means for advancing the recording medium perpendicular to the linear light source array as the depth of the downhole tool changes. A digital logic circuit controls the sequencing of the light sources and provides for the impression of vertical timing lines and horizontal depth lines on the medium by selective control of the signals applied to the respective light sources during each illumination sequence.

12 Claims, 4 Drawing Figures

BOREHOLE LOGGING SYSTEM WITH IMPROVED DISPLAY AND RECORDING APPARATUS

This invention relates generally to borehole logging apparatus and more particularly concerns improved apparatus for indicating the reception of acoustic energy and for recording the reception even on a storage medium.

The borehole log recorders heretofore known in the art have used conventional signal reproduction methods in recording the characteristics of a borehole in a permanent manner. Specifically, the art has taught the use of the electron beam of a cathode ray tube for sweeping a photosensitive recording medium and the use of strip recorders as output devices. The latter is an inherently inferior recording medium for borehole logging in that only two dimensions of information can be provided on a chart, while the former combination requires elaborate and expensive sweep and synchronization circuits and is accompanied by inherent difficulties in obtaining proper linearity and uniform focus across the entire face of the cathode ray tube.

It is a primary object of the present invention to provide an improved indicating and recording apparatus which presents three dimensions of information regarding the borehole characteristics with a degree of linearity and definition heretofore unavailable with the aforementioned conventional recording techniques. It is a related object of the present invention to provide signal indicating apparatus in which a linear sweep across a recording medium is produced by sequential energization of a linear series of individual light sources which, when energized, are intensity modulated to provide information corresponding to the magnitude and time occurrence of acoustic energy received within the borehole.

It is a more specific object to provide borehole logging apparatus using a linear array of individual light sources for impressing successive traces on a medium and a digital control circuit for controlling modulation of the traces in accordance with signals corresponding to the amplitude of the received acoustic energy, the time of occurrence of the transmitted acoustic signal and the depth of the downhole tool within the borehole. It is a related object of the present invention to provide a highly precise timing reference for synchronizing the presentation of information from the aforementioned signals so as to produce a log which is accurate, reliable and highly readable.

A further object of the present invention is the provision of borehole logging apparatus of the aforementioned type in which various characteristics of the recording traces are manually variable over a wide range so as to allow the user to focus on various characteristics of the recorded information.

Still another object of the present invention is the provision of borehole logging apparatus of the aforementioned type in which time marking lines and depth marking lines are impressed on the medium to facilitate analysis of the recorded information, the spacing between the time marking lines being manually variable in precise steps to allow the information on the recording to be more accurately analyzed with respect to time.

Other objects and advantages of the invention will become apparent from the following detailed description taken in connection with the accompanying drawings in which.

While the invention will be described in connection with certain preferred embodiments it is to be understood that the invention is not intended to be limited to the disclosed embodiments, but on the contrary, it is intended to cover the various alternatives, modifications and equivalents as may be included within the spirit and scope of the invention as defined by the appended claims.

Figure 1:
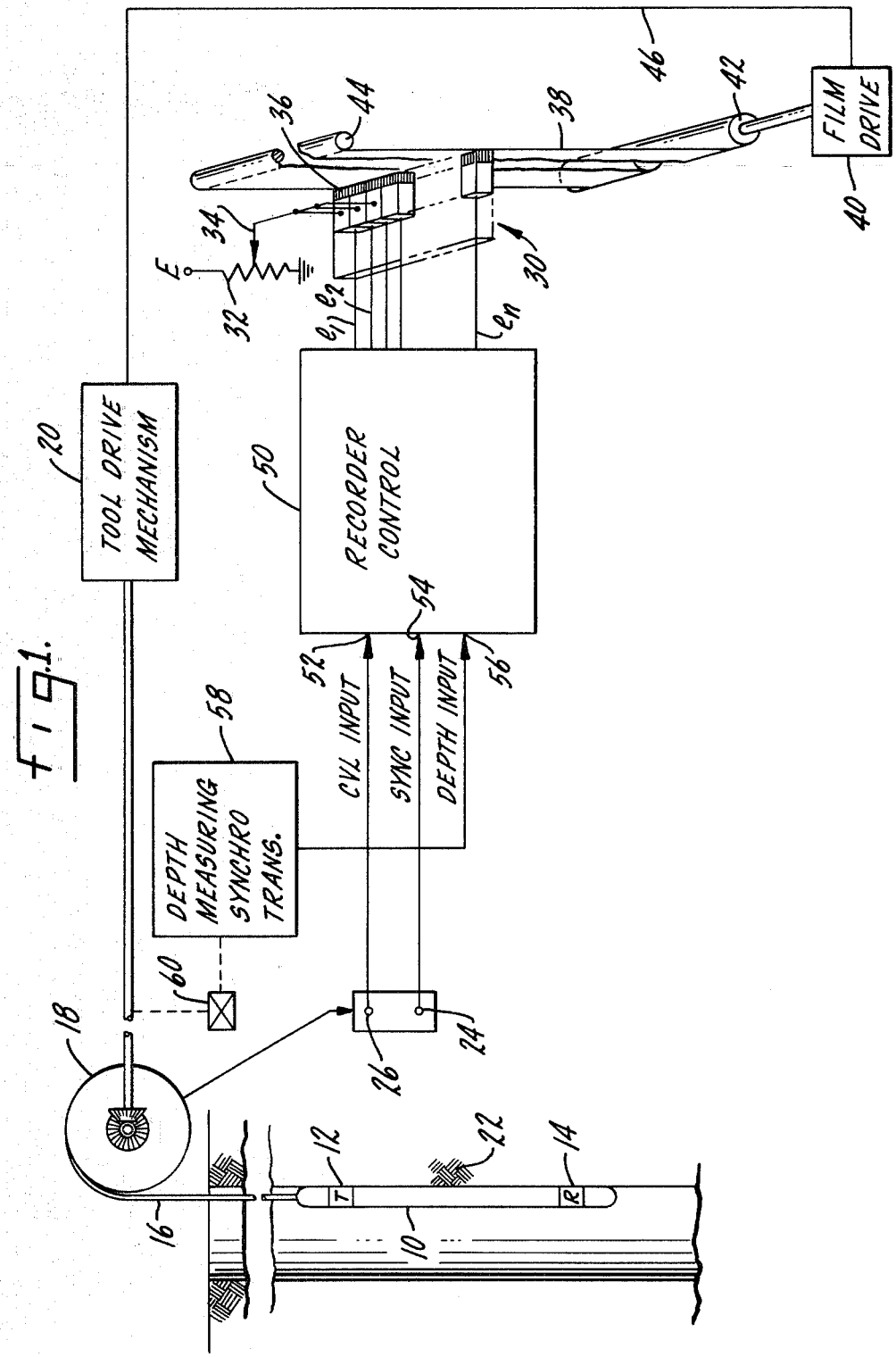
FIG. 1 is a schematic view, partially in block form, of the borehole logging apparatus of the present invention.

Turning now to the drawings, and more specifically to FIG. 1, there is disclosed a borehole logging system including a downhole tool 10 carrying an omnidirectional transmitter 12 and a receiver 14 spaced from the transmitter 12 by a fixed vertical distance. The transmitter 12 generates acoustic signals in periodic impulses at varying depths within the borehole, while the resultant acoustic waves, including both the initially arriving acoustic signals and the subsequently arriving wave energy, are detected by the receiver 14, which develops an output signal which varies in magnitude as a function of the magnitude of the detected acoustic energy. Surface equipment operatively associated with the transmitter and receiver and responsive to both the generated signals and the receiver output records data providing three dimensions of information, namely: (a) the instantaneous magnitude of the detected acoustic energy, (b) the transmit time or time of arrival of the detected acoustic energy waves with respect to the time of transmission of the acoustic signal creating the detected energy and (c) the depth of the downhole tool at the time when the recorded signals are generated.

One suitable transmitter useful with the present invention is in the form of a cylindrical ring designed so that a pulse of acoustic energy produces circumferential forces which radiate symmetrically in the radial direction and spread geometrically in the axial direction of the downhole tool 10. The transmitter 12 may be powered either from the surface or from a suitable power source in the downhole tool 10.

In order that the downhole logging tool may be moved vertically through the borehole at a controlled rate, it is suspended from a cable 16 which is trained about a roller 18 driven by a suitable drive mechanism 20. The borehole is bounded by subsurface earth formations 22 having characteristics to be determined by the logging system and may contain drilling fluid as is conventional in the art. Although the downhole logging tool 10 has been illustrated as including only a single receiver 14, it will be understood that two receivers would be more commonly employed in the commercial system. It will be appreciated also that the period between the acoustic impulses generated by the transmitter 12 should ordinarily be longer than the time required for the acoustic waves to travel to the receiver 14 even in the lowest velocity formations encountered in logging the borehole, so that sufficient time is provided for both the initially arriving components of the signal and the significant portions of the subsequently arriving complex waves to reach the receiver before the next acoustic impulse is generated.

Each time the transmitter 12 within the borehole generates an acoustic signal, it simultaneously transmits an electrical pulse through the cable conductor 16 to a surface terminal 24. As will be apparent from the ensuing description, each of these electrical pulses generated by the transmitter 12 is utilized to initiate a separate trace on the log, thereby synchronizing successive transverse traces on the log with the transmission of the acoustic impulses within the borehole. Accordingly, these electrical pulses are hereinafter referred to as the "sync" pulses, and the information provided at the terminal 24 is so labeled in FIG. 1.

The output signal of the receiver 14 representing the detected acoustic energy is carried through the cable 16 to a surface terminal 26. An electrical signal of this type, commonly referred to as a continuous velocity log signal, is well known in the acoustic exploration art and is hereinafter referred to as the "CVL" signal. It will be appreciated that the CVL signal is a complex wave resulting from the multiple medium paths traversed by the sonic energy generated by the transmitter 11, and the skilled analyst can obtain a considerable amount of information from such waves. In order to present the complex waves in a form which is useful to the analyst, it is desirable to provide a visible record of the varying amplitude of the successive CVL signals as a function of time.

Therefore, in accordance with the present invention there is provided a signal indicating mechanism which includes a plurality of light sources, indicated generally at 30, closely spaced in a linear array, the successive light sources being responsive to input signals $e_1, e_2 \ldots e_n$ applied thereto. An additional input to each light source is provided by an electrical bias generator 32 providing a constant magnitude electrical signal for illuminating each of the light sources to a uniform low intensity known to those skilled in the art as the "gray level." As shown, the generator 32 comprises a potentiometer connected between a DC supply voltage and ground potential and having an adjustable wiper 34 on which the output bias signal is provided. As will be hereinafter described, the illumination of each of the light sources is modulated about the "gray level" in accordance with the instantaneous magnitude of the receiver output signal.

The number n of individual light sources in the linear array 30 may vary according to the physical width of the total array and the size of each individual light source. For instance, argon lamps having a common anode have been used for this purpose. Approximately 700 of these small lamps have been packed into a linear array approximately 7-⅞ inches wide. Other light sources, such as multiple neon lights or light emitting diodes, can also be used in the linear light source array 30. For improving the resolution of the display provided by the light sources in the array 30, the fiber optic bundle 36 is provided instead of a conventional protective lens. Fiber optics have been found to be extremely valuable for this purpose in providing a high degree of definition in the resulting traces due to the ability of the optical fibers to reduce dispersion of the light from the source and crosstalk interference between adjacent sources.

In order to produce a permanent record of the activity of the light sources in the linear array 30, there is provided a light responsive recording medium in the form of a film 38 advanced by a film drive mechanism 40. The film 38 is of sufficient width to horizontally record the light emissions of the entire array 30 and is vertically advanced across the array 30 from a supply reel 42 to a take-up reel 44 by the film drive mechanism 40, which is synchronized to the tool drive mechanism 20 through an electrical connection 46. In normal operation, the downhole tool 10 is advanced through the borehole at a predetermined rate, while, at the same time, the recording medium is advanced perpendicular to the linear light source array 30 at a speed corresponding to the tool rate so that successive linear traces occur at varying levels on the medium corresponding to the varying depths of the down-hole tool 10.

For controlling the sequential energization of the light source array 30 in response to the sync and CVL signals, there is provided a recorder control circuit 50 having first, second and third inputs 52, 54, 56 connected respectively to the tool output terminals 26, 24 and the output of a depth measuring synchro transmitter 58, which is mechanically driven by the tool drive mechanism 20 through a step-down gear 60. The control circuit 50 has a plurality of outputs, one for each of the n light sources, on which the illumination control signals $e_1, e_2 \ldots e_n$ are provided.

Figure 2:
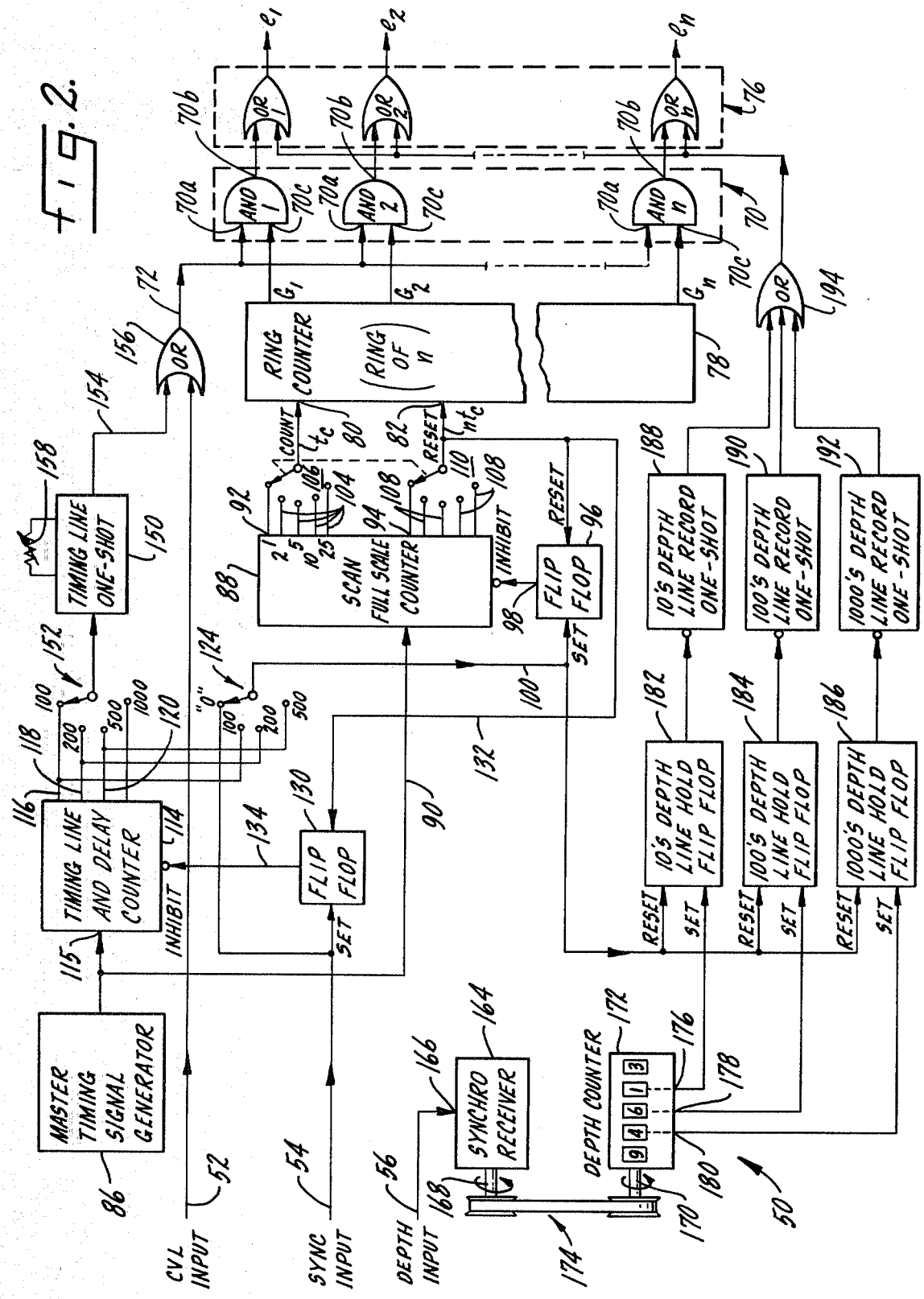
FIG. 2 is a circuit block diagram of a portion of the invention shown generally in FIG. 1.

The recorder control circuit 50, shown in detail in FIG. 2, provides th gating, synchronization, and timing necessary in processing the data available at the CVL, sync and depth inputs so that a highly intelligible and useful record results on the recording medium. It will be recalled from the foregoing general description that three dimensions or types of information result on the medium. First, the intensity or darkness at any point in a resulting trace on the medium represents the instantaneous magnitude or amplitude of the acoustic energy detected at the receiver 14 and represented by the amplitude of the CVL signal. The horizontal position of any point in a resulting trace on the medium reflects the transit time for the energy received at a particular instant with respect to both the time of transmission from the transmitter and the time of reception at the receiver 14 of other portions of the received energy shown in the same trace. Finally, the vertical position of a given trace on the medium reflects the position of the downhole tool 10 in the borehole as a result of the synchronization between the tool drive mechanism 20 and the film drive 40. This third form of information results from the fact that, as the film 38 is advanced, each successive trace formed by the transverse energization of the successive light sources is a slight longitudinal distance from the preceding trace so that, as a result, the successive transverse traces are developed in a side-by-side relationship on the film with the starting points aligned longitudinally as illustrated in the exemplary record of FIG. 4. Of course, each trace varies in density across the width of the film in accordance with variations in the amplitude of the CVL signal used to modulate the intensity of the individual light sources.

For the purpose of controlling the intensity or illumination of each light source, there is provided a plurality of gates for selectively receiving and passing the CVL input signal from the receiver 14 so as to energize the individual light sources. The principal control gate for each light source is a two-input analog AND gate, the group of which is designated generally at 70 in FIG. 2. Each of the gates 70 has a data input terminal 70a, an output terminal 70b and a control input terminal 70c. A common input line 72 normally carries the CVL input signal to each of the data inputs 70a of the gates 70 simultaneously. The output terminal 70b from each of the gates 70 is normally coupled to the input of a corresponding light souce through one of a plurality of analog OR gates 76 to be hereinafter described. The transfer of the CVL input signal to the output terminal 70b of any of the gates 70 results from the occurrence of an enabling signal at the control input 70c of that particular gate. While digital gate symbols are used for illustrative purposes in FIG. 2, it is again emphasized that the gates in the CVL signal chain are all linear with respect to passage of the CVL signal, i.e., when activated, the output of each gate varies in amplitude according to the amplitude of the data input to that gate.

It is desired that the successive light sources in the linear array 30 be energized to an intensity corresponding to the magnitude of the CVL input signal in a linear sequence between successive transmissions of acoustic energy from the transmitter 12. For this purpose, the gates 70 are successively and sequentially enabled by an electronic commutating device in the form of a digital ring counter 78 providing a plurality of enabling output signals $G_1, G_2 \ldots G_n$ connected to the control inputs 70c of the respective signal gates 70 for each of the light sources. The ring counter 78, typically consisting of n bistable stages, operates in a manner well known to those skilled in the digital controls art, in which only one of the counter stages is in the ON condition at any given time so as to enable the corresponding one of the gates 70 and wherein the ON condition advances sequentially from stage to stage throughout the counter. The counter is advanced by pulses received at a count input 80 and reset to its initial condition or starting point by the occurrence of a pulse at a reset input 82.

Since it is desired to have one linear energization sequence of the light source array 30 occur during each interval between the generation of successive acoustic signals by the transmitter 12, means are provided for initiating operation of the commutating device or ring counter 78 in synchronism with the occurrence of the acoustic energy signals from the tool transmitter and for driving the commutating device at a rate which allows completion of the linear energization sequence between the transmission of successive acoustic energy signals. These multiple functions are accomplished through the provision of a master timing clock or reference generator 86 which provides a timing signal at a fixed high frequency and a digital counter 88 which receives the timing signal on an input line 90. The digital counter 88 divides down the frequency of the timing signal by a first division factor and produces at an output 92 the clock pulses required for driving the count input 80 of the ring counter 78. Additionally, the digital counter 88 divides the frequency of the master timing signal by a second division factor and produces a pulse at an output 94 for resetting the ring counter 78 via its reset input 82.

The counter 78 is reset to its initial condition after $n$ clock pulses have occurred at its count input 80, $n$ being the number of individual light sources in the array 30 and the number of steps in the commutation sequence discussed previously. Therefore, if the digital counter 88 were a continuously driven counter, the period of the reset pulses at the output 94 would be $nt_c$, where $t_c$ is the period of the pulses occurring at the count pulse output 92 of the counter 88.

However, the digital counter 88 is not continuously driven, but rather is controlled by a flip-flop 96 which is provided for the purpose of rendering the frequency divider or counter 88 operative in response to the generation of an acoustic signal by the transmitter 12 and for rendering the counter 88 inoperative upon resetting of the ring counter 78. As such, the flip-flop 96 insures that only one commutation sequence occurs between successive acoustic signals. As illustrated, the flip-flop 96 inhibits operation of the counter 88 when the signal at its output terminal 98 goes low, which occurs when a pulse occurs at the reset input 82 of the ring counter 78. The set input to the flip-flop 96 is activated by a signal on a line 100 which occurs as a result of, although not necessarily coincident with, the occurrence of a pulse at the sync input. Setting the flip-flop 96 drives its output 98 high to render the counter 88 operative so as to initiate the next commutating sequence.

Briefly reviewing the operation of the commutating ring counter 78 and its associated control circuits, the generation of an acoustic signal by the transmitter 12 creates a pulse at the sync input which results in a pulse occurring on the line 100 to set the flip-flop 96. As the flip-flop 96 assumes its set state, the digital counter 88 is rendered operative to divide the high frequency of the master timing signal continuously occurring on the input line 90 so as to generate a train of pulses for driving the count input 80 of the ring counter 78. The commutation sequence begins, and successively occurring enabling signals $G_1, G_2 \ldots G_n$ are generated at the outputs of the ring counter 78.

These enabling signals sequentially activate the control inputs 70c of the gates 70 to pass the CVL input signal from the line 72 to the respective digital light sources in the linear array 30 (FIG. 1). When n pulses have occurred at the count input 80 to the counter 78, the output 94 from the digital counter 88 produces a pulse for resetting the counter 78 and for simultaneously resetting the flip-flop 96 so as to render the counter 88 inoperative and thereby to end the commutating sequence. During the commutating sequence one linear trace is impressed horizontally across the recording medium. The full-scale scan time, i.e., the time required to create a single trace, is determined by the period $t_c$ of the pulses occurring at the count input to the ring counter 78 and, of course, the number n in the commutating sequence.

To facilitate analysis of the resulting borehole logs, means are provided for manually adjusting the full-scale scan time so that the operator can focus on certain time characteristics of the borehole logs. To this end, the digital counter 88 is provided with a plurality of alternate outputs 104 on which pulses occur similar to those occurring at the principle counter output 92 but at successively lower frequencies. A manually controlled rotary switch 106 allows the operator to chose between the output 92 or any of the outputs 104 for driving the count input 80 of ring counter 78. Although any desired scan time could be provided by the provision of appropriate outputs from the digital counter 88, outputs providing scan times of 1, 2, 5, 10 and 25 milliseconds are illustrated.

In conjunction with the alternate outputs 104 for providing the pulses to the count input 80 of the counter 78, there is provided a plurality of alternate outputs 108 which correspond to the outputs 104 and provide reset pulses to the input 82 of the counter 78 at successively longer intervals. For instance, if the full scale scan time is doubled from one millisecond to two milliseconds by doubling the period $t_c$ of the pulses at the count input 80, a corresponding doubling must occur in the period before which the reset pulse at the input 82 to the counter 78 occurs. This insures that the full commutation cycle is completed irrespective of the full-scale scan time. For this purpose a second rotary switch 110, which is ganged mechanically to the first rotary switch 106, is provided.

In order to delay the initiation of the commutating sequence of the counter 78 for a brief initial period, typically 100 to 500 microseconds, while the first acoustic wave is travelling to the receiver, there is provided a timing line delay counter 114 having a clock input 115 driven by the master timing signal provided by the generator 86. The delay counter 114 acts as a frequency divider for the master timing signal and has a plurality of outputs 116, 118 and 120 on which pulses occur at intervals of 100, 200 and 500 microseconds respectively. The outputs 116, 118, 120 are connected to three of the poles of the rotary switch 124. A fourth pole of the rotary switch is connected to receive the sync input signal directly from the transmitter 12 of the downhole tool. The contact arm of the switch 124 connects a selected one of these four poles to the line 100 providing the set input to the flip-flop 96. Controlling the delay counter 114 is a flip-flop 130 having a set input connected to receive the sync signal and a reset input activated simultaneously with the reset input 82 of the ring counter 78 via an electrical connection 132. The output 134 of the flip-flop 130 goes low to inhibit operation of the delay counter 114 when a pulse occurs at the reset input at the end of the commutation sequence. The output 134 goes high to enable or activate the delay counter 114 upon the occurrence of a sync signal from the transmitter 12. In the illustrated embodiment the contact arm of the switch 124 connects the sync input directly to the line 100, in which case there is no delay in initiating the commutation sequence after the occurrence of the sync input. If the switch 124 is advanced to its second position, in which the 100 microsecond output of the delay counter 114 is connected to the line 100, initiation of the commutation sequence occurs in the following manner. The sync input sets the flip-flop 130 so that its output 134 goes high to activate the delay counter 114. After a 100 microsecond delay, a pulse is created at the output terminal 116 which is connected through the switch 124 to set the flip-flop 96 and initiate the commutation sequence. Similarly, advancing the contact arm of the switch 124 to the third or fourth poles (designated 200 and 500 respectively) results in delays of 200 or 500 microseconds respectively in the initiation of the commutation sequence.

Figure 3:
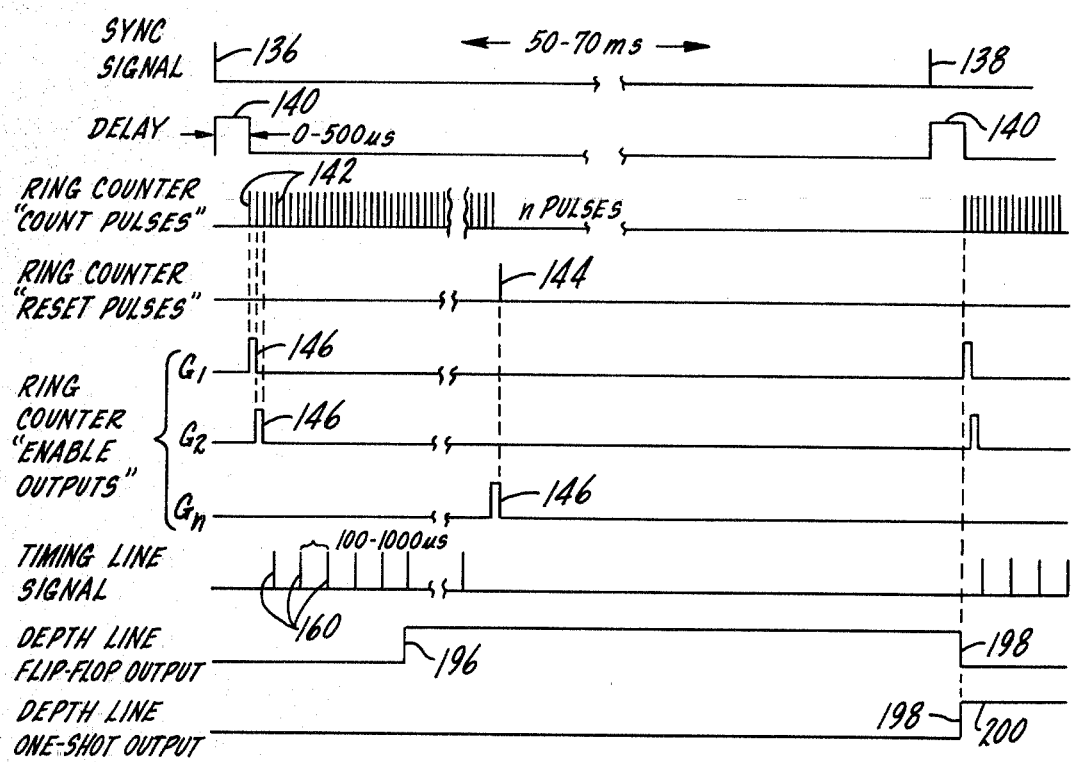
FIG. 3 is a timing diagram of the signals produced at various points in the system shown in FIGS. 1 and 2.

To facilitate an understanding of the operation of the recorder control circuit disclosed thus far, reference is made to the timing diagrams shown in FIG. 3. Successive sync pulses 136, 138 occur at intervals of 50 to 70 milliseconds as a result of the generation of acoustic energy by the transmitter 12. After a delay 140 resulting from the positioning of the contact arm of the switch 124 in either of its last three positions, the flip-flop 96 is set by a pulse on the line 100 and activates the digital counter 88. Frequency division of the master timing signal from the generator 86 results in the generation of the pulses 142 at the input 80 to the ring counter 78. The occurrence of n pulses at the input 80 steps the ring counter 78 through its entire commutation sequence and sequentially energizes each of the individual light sources in the array 30 in succession. At the end of the sequence a counter reset pulse 144 is produced by the counter 88 for resetting the ring counter 78 to its initial or starting condition.

During the commutation sequence the signals $G_1, G_2 \ldots G_n$ are successively activated, as indicated at 146, to pass the CVL signal from the line 72 through the gates 70 to each of the light sources in succession. The pulse 144 at the ring counter reset input 82 simultaneously resets the flip-flop 96 and the flip-flop 130 so as to deactivate both the counter 88 and the counter 144 and to place them in readiness for the receipt of another sync input signal.

In order to facilitate correlation of any given portion of the horizontal traces on the recording medium with the particular transit time corresponding to that portion of the trace, means are provided for forming time markings at equally spaced transverse intervals along each trace. The time markings on adjacent traces are so aligned with respect to each other that a longitudinal series of such traces forms longitudinal time lines extending vertically through the traces along the length of the recording medium. Generation of the timing lines is facilitated by the delay counter 114 which divides the frequency of the master timing signal to produce pulses at selected intervals of 100, 200, 500 or 1,000 microseconds in the manner described previously in connection with the initiation delay function. A selected one of the outputs of the counter 114 is coupled to a timing line one-shot circuit 150 through a rotary manual switch 152. When activated, the one-shot circuit 150 produces an output signal of a fixed magnitude and width on a line 154 which is connected to the input of an analog OR gate 156. Although not shown in detail, the OR gate 156 is constructed so that the timing signal from the one-shot 150 replaces the CVL signal on the output line 72 feeding the signal gates 70. The activation period of the timing line one-shot 150 is controlled by a variable resistor 158 which allows the time persistence of the timing lines to be coordinated with the interval between successive timing lines.

Figure 4:
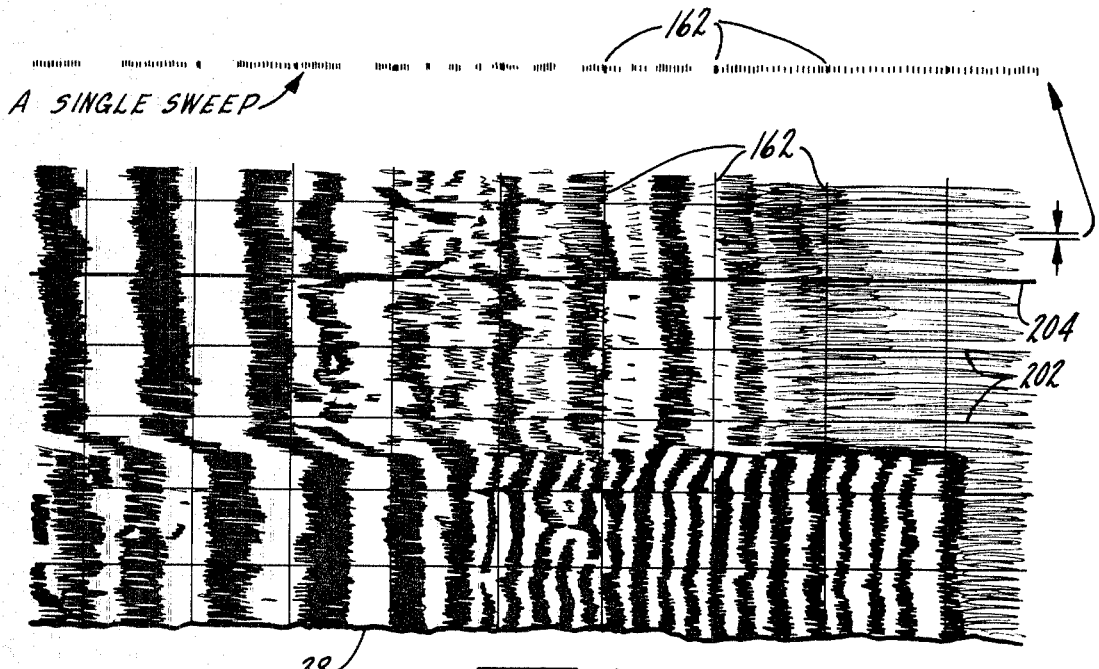
FIG. 4 is an exemplary view of a portion of a log record produced by the logging apparatus shown in FIGS. 1 and 2.

Referring to the timing diagram of FIG. 3 and the exemplary log of FIG. 4, it is seen that the counter 114 feeds timing pulses 160 at regular intervals to the one-shot 150 during each linear energization sequence of the light sources. The resulting periodic instantaneous increases in the signal on the line 72 produce regular dots or marks of uniform darkness at equally spaced intervals across each horizontal trace on the recording medium. Consequently, as a multiplicity of traces are produced in close succession, the dots of adjacent traces tend to overlap and blend together to form a facsimile of a series of continuous, longitudinal lines 162 with the space between each pair of lines representing a timed interval. In analyzing the resulting log, the number of lines from the right hand or zero margin of the three-dimensional record can be counted to allow the analyst to readily determine the transit time represented by any specific portion of the record and thereby determine the effect of the geological formation at that particular area on the velocity of the acoustic signal.

In order that the analyst may readily determine the particular borehole depth corresponding to any given point on the recorded variable density log, a depth marking circuit is provided which is associated with the tool advancing means and responsive to the achievement of predetermined equally-spaced tool depths to provide indications of the achievement of successive depth intervals on the recording medium. The depth marking circuit impresses a line of constant darkness across the recording medium by replacing the CVL signal as the input to the individual light sources during selected commutating sequences.

Returning to FIG. 2, the depth marking apparatus includes a synchro receiver 164 having an input 166 which receives the electrical depth indicating signal from the synchro transmitter 58 shown in FIG. 1. An output shaft 168 rotates through an angle corresponding to the magnitude of the signal at the input 166 to the receiver 164 and drives an input shaft 170 to a depth indicator or counter 172 via a belt and pulley combination 174. The depth indicator 172 may be any one of a number of devices commonly known in the art which provides a multi-digit decimal output in accordance with the rotary motion of an input shaft. For monitoring the respective digits of the decimal number displayed by the indicator 172, a plurality of outputs 176, 178, 180 are provided for giving an electrical indication of changes in any one of the 10's, 100's, or 1,000's digits respectively. The indicator outputs 176, 178 and 180 are respectively connected to the inputs of the depth line hold flip-flops 182, 184 and 186. The reset input to each of the flip-flops 182, 184 and 186 is controlled by pulses occurring on the line 100 which, as noted previously, occur in synchronism with the sync input signal and initiate the successive commutation sequences.

So that changes in the higher order digits of the display 172 result in darker or wider depth lines on the recording medium than do changes in the lower order digits of the display 172, means are provided for controlling the time persistence of the respective 10's, 100's and 1,000's depth lines individually. To this end, the flip-flop 182 feeds a first depth line record one-shot circuit 188; the flip-flop 184 feeds a second depth line record one-shot 190; and the flip-flop 186 feeds a third depth line record one-shot 192. The one-shot circuits 188, 190 and 192 are typically bistable devices having ON periods of successively increasing duration corresponding to the increasing significance of the digits to which they are responsive. For example, the period of the one-shot circuit 188 may be 100 milliseconds in duration, while the period of th one-shot circuit 192 might be 500 milliseconds in duration to reflect an increase in the significance of the depth achieved. The outputs from each of the one-shot circuit 188, 190 and 192 are simultaneously applied as inputs to a signal gate 194 which, unlike the gates 70, 76 or 156, may be a conventional digital OR gate. The output of the gate 192 is coupled to each of the light sources in the array 30 simultaneously through the analog OR gates 76. It is contemplated that each of the OR gates 76, like the gate 156, allows the constant magnitude output signal of the OR gate 194 to pass to the light sources to the exclusion of or in replacement of any signal which might be present at the outputs 70b of the linear AND gates 70. Additionally, it is here noted that the one-shot circuits 188, 190 and 192 are each triggered to the ON condition as the output of the flip-flops 182, 184, 186 respectively go low. This negative response characteristic is illustrated diagrammatically by the presence of a small circle at the input to each one-shot circuit. Small circles are similarly shown at the "inhibit" inputs to the counter 88 and 114 to illustrate that each of these counters is inhibited or rendered ineffective by a low level or negative-going signal.

The operation of the depth marking circuit is more easily understood through reference to the timing diagram of FIG. 3 and the log of FIG. 4. As the tool 10 passes through the borehole, the signal at the input 166 to the synchro receiver 164 continuously changes and causes mechanical advancement of the depth counter 172 via the mechanical linkage 168, 170, 174. As the 10's digit changes, a signal is produced at the output 176 which sets the flip-flop 182, as illustrated at 196 in FIG. 3. Although ineffective on the light sources in the array 30 at this time, the flip-flop 182 remains set, with its output high, until the beginning of the next commutation sequence, at which time a pulse generated on the line 100 resets the flip-flop 182, triggering the one-shot circuit 188 to the ON condition, illustrated at 198. The output signal 200 activates the OR gate 194 so as to pass a constant magnitude signal to each of the gates 76 simultaneously. Depending on the time constant of the one-shot circuit 188, the entire linear light source array 30 is illuminated to a uniform brightness, resulting in a uniformly dark horizontal line across the recording medium or film 38, as illustrated by the horizontal lines 202 appearing on the exemplary log of FIG. 4.

The 100's and 1,000's depth marks are produced in a similar manner and appear as successively wider horizontal lines (e.g., note the line 204 on the exemplary log of FIG. 4) due to the increased time persistence of the ON condition of the one-shot circuits 190 and 192. Since the depth counter 172 is synchronized to the movement of the downhole tool, and since depth lines are created by monitoring changes in the significant digits of the counter display, it will be apparent that depth lines occur on the borehole log at equally-spaced intervals. The depth counter 172 may be positioned adjacent the recording medium to allow the operator to continuously correlate the actual depth with the depth marks. If the recording medium is enclosed in a camera housing, the actual depth can be photographically recorded adjacent the corresponding depth line by positioning the indicator 172 at either end of the linear light array 30 and by illuminating the digits of the indicator 172 simultaneously with the occurrence of the depth markings or lines 202, 204. Where a continual depth readout to the operator is required, such may be provided by the indicator 172, and a separate depth display advanced in accordance with the indicator 172 may be used inside the camera for recording purposes. Light emitting diode (LED) readouts are suitable for this purpose.

The exemplary record of FIG. 4 is included to illustrate the operational characteristics of the system as a whole and is not intended to accurately represent an actual record, since it is difficult to illustrate intensity modulation or "gray level" on black-on-white drawings. Furthermore, the resulting record will vary slightly in its visual characteristics as a function of the particular light sources chosen and as a result of any filters that might be used between the display devices and the recording medium. For instance, if the individual light sources chosen are of the neon type, a filter might be required, since most film used for this purpose is insensitive to the red color or neon. Alternately, argon gas light sources might be chosen for their favorable modulation characteristics and for their blue-white color.

The term "flip-flop", as used herein, denotes a multivibrator circuit of a bistable or two-state nature. In its "set" state, the flip-flop produces an output at a first logic level, typically logic 1; while in its "reset" state, the flip-flop produces an output at a second logic level, typically logic 0. As used herein, the flip-flops alternately assume their "set" and "reset" states in response to the occurrence of appropriate pulses at their "set" and "reset" inputs respectively.

The terms "commutation" or "commutating," as used herein, refer to the process of enabling a signal from a single input channel to be coupled to a plurality of output channels in a predetermined sequence.

The term "one-shot", as used herein, denotes a circuit, typically a monostable multivibrator, that produces an output signal of fixed duration in response to the occurrence of an input signal of any duration.

The term "acoustic energy," as used herein, includes all energy capable of propogation between a transmitter and a receiver through liquids, solids or gases, and the term is nOt to be construed to limit the type of energy being transmitted to those frequencies falling within the humanly audible range.

I claim as my invention:

1. In borehole logging apparatus the combination of a downhole tool having transmitter means for periodically generating an acoustic signal at varying depths within a borehole; receiver means spaced from said transmitter means for receiving the acoustic energy resulting from said acoustic signal and for producing an output signal varying in magnitude as a function of the magnitude of said detected acoustic energy, signal indicating means including a plurality of light sources closely spaced in a linear array; gating means associated with said light sources for energizing said light sources in accordance with the magnitude of said output signal from one end of said linear array to another in linear sequence so that successive light sources are illuminated to an intensity corresponding to the magnitude of successively occurring portions of said receiver output signal, the intensity of illumination of said light sources providing a first dimension of information corresponding to the instantaneous magnitude of the detected acoustic-energy and the energization sequence of said light sources providing a secoond dimension of information corresponding to the time of arrival of said acoustic-energy with respect to the time of transmission of said acoustic signal; a light responsive recording medium selectively illuminated by said light sources so as to record said first and second dimensions of information as a transverse linear trace of varying darkness; means for advancing said downhole tool through said borehole at a predetermined rate; means associated with said tool advancing means for advancing said recording medium in a direction perpendicular to said linear light source array at a speed corresponding to said predetermined rate of tool advance so that successive linear traces occur at varying levels on said medium corresponding to the varying depths of said downhole tool; depth recording means, including means for registering depth as a multi-digit decimal number, operatively associated with said tool advancing means and responsive to the achievement of predetermined equally-spaced tool depths for impressing a line of uniform darkness across the surface of said recording medium to indicate the achievement of said depths thereon; means associated with said registering means for monitoring the respective digits of said decimal number and providing a plurality of outputs for indicating changes in value of the successively higher order digits of said decimal number; a plurality of time delay means respectively connected to said outputs for providing depth lines across said recording medium whenever any one of said monitored digits changes; means for increasing the width of said depth lines in accordance with the order of the changing digit; and means associated with said transmitter means and operative on said gating means for initiating said sequence in response to the generation of said acoustic signal.

2. In borehole logging apparatus the combination according to claim 1 wherein said downhole tool achieves varying depths at a predetermined rate, and wherein said combination further includes means operatively associated with said downhole tool for advancing said recording medium perpendicularly past said light sources at a speed which is proportional to said predetermined rate of depth variation of said downhole tool so that the vertical position of the trace on said medium provides a third dimension of information corresponding to the depth of said downhole tool at the time when the acoustic signal resulting in said trace is generated.

3. In borehole logging apparatus the combination according to claim 2 further including time marking means associated with said transmitter means and said recording medium for replacing said receiver output signal with constant magnitude time signal for energizing said light sources at selected interval in each sequence so that selected portions of each transverse linear trace on said recording medium are of a constant degree of darkness and so aligned in successive traces that vertical time lines result on said recording medium as it advances perpendicular to said array of light sources.

4. In borehole logging apparatus the combination according to claim 1 further including time marking means operatively associated with said transmitter means for providing a constant magnitude signal at predetermined time intervals during each sequence and means for selectively energizing said light source with said constant magnitude signal so that a time reference with respect to the generation of said acoustic signal appears on said recording medium.

5. In borehole logging apparatus the combination according to claim 1 wherein said sequence initiating means further includes a time delay device for delaying initiation of the sequence for a predetermined time interval after generation of said acoustic signal.

6. In a borehole logging apparatus the combination of a downhole tool having transmitter means for periodically generating an acoustic signal at varying depths within a borehole; receiver means spaced from said transmitter means for receiving the acoustic energy resulting from said acoustic signal and for producing an output signal varying in magnitude as a function of the magnitude of said detected acoustic energy; signal indicating means including a plurality of light sources closely spaced in a linear array; gating means associated with said light sources for energizing said light sources in accordance with the magnitude of said output signal from one end of said linear array to another in linear sequence so that successive light sources are illuminated to an intensity corresponding to the magnitude of successively occurring portions of said receiver output signal; means for advancing said downhole tool through said borehole at a predetermined rate; depth indicating means, including means for registering depth as a multi-digit decimal number, operatively associated with said tool advancing means and responsive to the achievement of predetermined equally-spaced tool depth for simultaneously energizing the light sources in said linear array to uniform intensity to indicate the achievement of said depths; means associated with said registering means for monitoring the respective digits of said decimal number and providing a plurality of outputs for indicating changes in value of the successively higher order digits of said decimal number; a plurality of time delay means respectively connected to said outputs for simultaneously energizing said plurality of light sources whenever any one of said monitored digits changes; means for increasing the illumination period of said light sources in accordance with the order of the changing digit; and means associated with said transmitter means and operative on said gating means for initiating said sequence in response to the generation of said acoustic signal.

7. In borehole logging apparatus the combination of a downhole tool capable of achieving varying depths at a predetermined rate and having transmitter means for periodically generating an acoustic signal at varying depths within a borehole; receiver means spaced from said transmitter means for receiving the acoustic energy resulting from said acoustic signal and for producing an output signal varying in magnitude as a function of the magnitude of said detected acoustic energy; signal indicating means including a plurality of light sources closely spaced in a linear array; gating means associated with said light sources for energizing said light sources in accordance with the magnitude of said output signal from one end of said linear array to another in linear sequence so that successive light sources are illuminated to an intensity corresponding to the magnitude of successively occurring portions of said receiver output signal; the intensity of illumination of said light sources providing a first dimension of information corresponding to the instantaneous magnitude of the detected acoustic-energy and the energization sequence of said light sources providing a second dimension of information corresponding to the time of arrival of said acoustic energy with respect to the time of transmission of said acoustic signal; a light responsive recording medium selectively illuminated by said light sources so as to record said first and second dimensions of information as a transverse linear trace of varying darkness; means operatively associated with said downhole tool for advancing said recording medium perpendicularly past said light sources at a speed which is proportional to said predetermined rate of depth variation of said downhole tool so that the vertical position of the trace on said medium provides a third dimension of information corresponding to the depth of said downhole tool at the time when the acoustic signal resulting in said trace is generated; means associated with said transmitter means and operative on said gating means for initiating said sequence in response to the generation of said acoustic signal; time marking means associated with said transmitter means and said recording medium for replacing said receiver output signal with a constant magnitude time signal for energizing said light sources at selected intervals in each sequence so that selected portions of each transverse linear trace on said recording medium are of a constant degree of darkness and so aligned in successive traces that vertical time lines result on said recording medium as it advances perpendicular to said array of light sources; and means associated with said time marking means for adjusting the interval between successive timing lines across said medium.

8. In borehole logging apparatus the combination of a downhole tool capable of achieving varying depths at a predetermined rate and having transmitter means for periodically generating an acoustic signal at varying depths within a borehole; receiver means spaced from said transmitter means for receiving the acoustic energy resulting from said acoustic signal and for producing an output signal varying in magnitude as a function of the magnitude of said detected acoustic energy; signal indicating means including a plurality of said sources closely spaced in a linear array; gating means associated with said light sources for energizing said light sources in accordance with the magnitude of said output signal from one end of said linear array to another in linear sequence so that successive light sources are illuminated to an intensity corresponding to the magnitude of successively occurring portions of said receiver output signal; the intensity of illumination of said light sources providing a first dimension of information corresponding to the instantaneous magnitude of the detected acoustic-energy and the energization sequence of said light sources providing a second dimension of information corresponding to the time of arrival of said acoustic energy with respect to the time of transmission of said acoustic signal; a light responsive recording medium selectively illuminated by said light sources so as to record said first and second dimensions of information as a transverse linear trace of varying darkness; means associated with said transmitter means and operative on said gating means for initiating said sequence in response to the generation of said acoustic signal; time marking means associated with said transmitter means and said recording medium for replacing said receiver output signal with a constant magnitude time signal for energizing said light sources at selected intervals in each sequence so that selected portions of each transverse linear trace on said recording medium are of a constant degree of darkness and so aligned in successive traces that vertical time lines result on said recording medium as it advances perpendicular to said array of light sources; and means associated with said time marking means for adjusting the interval between successive timing lines across said medium.

9. In apparatus for producing borehole logs from signals respectively representing the depth of the downhole tool, the acoustic energy generated by the tool transmitter, and the acoustic energy output of the tool receiver, improved recording means comprising, in combination, a plurality of light sources closely spaced in a linear array; a plurality of signal gates, one for each light source, each having a data input, an output for driving its associated light source and a control input for selectively coupling said data input to said output; means for coupling said receiver output signal to the data inputs of all of said signal gates simultaneously; an electronic commutating device comprising a digital ring counter having multiple stages respectively connected to the corresponding control inputs of said signal gates for sequentially enabling said signal gates so that said light sources are successively energized one at a time in accordance with the magnitude of said receiver output signal from one end of said linear array to the other in a linear sequence; commutator control means for repetitively initiating the operation of said commutating device by selectively providing clock pulses for sequentially advancing the ON condition from one of said counter stages to the next in synchronism with the occurrence of said acoustic energy signals from the tool transmitter, said commutator control means being responsive to the completion of said commutation sequence for resetting said ring counter to a predetermined starting condition in readiness for initiation of the next commutating sequence, and said commutating device operating at a rate which is substantially greater than the repetition rate of said acoustic signals so that said linear energization sequence is completed between the transmission of successive acoustic energy signals; a light responsive recording medium selectively illuminated by said light sources and so positioned with respect to said sources that each sequence of energization of said light sources produces across said medium a transverse linear trace having a degree of darkness which varies according to the instantaneous magnitude of said receiver output signal; and a master timing reference providing a timing signal at a fixed high frequency; said commutator control means further including a digital counter for dividing down said high frequency timing signal by a first division factor for providing said clock pulses and for dividing down said high frequency timing signal by a second division factor to effect resetting of said ring counter after a number of said clock pulses have been produced equal to the number of said light sources.

10. In apparatus for producing borehole logs the combination according to claim 9 further including divider control means for rendering said frequency division means operative in response to the generation of said acoustic signal and for rendering said frequency division means inoperative upon resetting of said ring counter so that only one commutation sequence occurs between successive acoustic signals.

11. In apparatus for producing borehole logs the combination according to claim 9 further including a time delay device operatively associated with said divider control means for delaying the activation of said frequency division means for a predetermined interval after the generation of said acoustic signal.

12. In apparatus for producing borehole logs from signals respectively representing the depth of the downhole tool, the acoustic energy generated by the tool transmitter, and the acoustic energy output of the tool receiver, improved recording means comprising, in combination, a plurality of light sources closely spaced in a linear array; gating means associated with each of said light sources for receiving a plurality of input signals and for selectively coupling said input signals to energize the respective light sources for predetermined intervals and at predetermined repetition rates; gate control means for successively enabling the gating means associated with each of said light sources in a linear sequence so that successive light sources are illuminated to an intensity corresponding to the magnitude of the then operative input signal to said gating means; a light responsive recording medium selectively illuminated by said light sources and so positioned with respect to said sources that each sequence of energization of said light sources produces across said medium a transverse linear trace having a degree of darkness which varies according to the instantaneous magnitude of the input to said gating means; means responsive to said depth indicating signal for advancing said recording medium in a direction perpendicular to said linear array in accordance with changes in the depth of said downhole tool so that the vertical position of any linear trace on said recording medium corresponds to the depth of said tool at the time said trace is produced; means for simultaneously coupling said receiver output signal as an input to the gating means for each of said light sources; time marking means providing a constant magnitude signal for replacing said receiver output signal as an input to said gating means at equal intervals during each sequence so that equally spaced vertical timing lines are recorded on said medium; depth marking means rendered operative at equal intervals of depth of said downhole tool for providing a constant magnitude signal as an input to the gating means for each of said light sources simultaneously during selected commutating sequences so that equally spaced depth lines of a uniform darkness are produced laterally across said recording medium, said depth marking means including a time persistence control for determining the number of commutating sequences during which said depth marking means is effective and thereby determining the width of said depth marking lines.

* * * * *